United States Patent [19]

Beery

[11] 4,386,842

[45] * Jun. 7, 1983

[54] PROGRAMMED ACCELERATION

[75] Inventor: Jack Beery, Fairport, N.Y.

[73] Assignee: Xerox Corporation, Stamford, Conn.

[*] Notice: The portion of the term of this patent subsequent to Feb. 1, 2000, has been disclaimed.

[21] Appl. No.: 219,417

[22] Filed: Dec. 4, 1980

[51] Int. Cl.³ .......................................... G03G 15/28
[52] U.S. Cl. ........................................................ 355/8
[58] Field of Search ................................ 355/8, 81, 84

[56] References Cited

U.S. PATENT DOCUMENTS

| | | | |
|---|---|---|---|
| 3,424,526 | 1/1969 | Sacre | 355/10 |
| 3,554,640 | 1/1971 | Hoskins | 355/8 |
| 4,000,943 | 1/1977 | Bar-on | 355/8 |
| 4,150,873 | 4/1979 | Dali | 358/285 |
| 4,243,311 | 1/1981 | Tohyama et al. | 355/8 |
| 4,287,461 | 9/1981 | Promis et al. | |

FOREIGN PATENT DOCUMENTS 55-12934  1/1980  Japan .

OTHER PUBLICATIONS

U.S. Ser. No. 80,624, filed 10/1/79 by Warren Hall, Jr., entitled "Open Loop Controller".

*Primary Examiner*—G. Z. Rubinson
*Assistant Examiner*—Keith E. George
*Attorney, Agent, or Firm*—Ronald F. Chapuran

[57] ABSTRACT

The present invention is a programmed clutch for controlling the acceleration of a scanning carriage at scan return (flyback). An encoder including an electro-optic sensor mounted on a moving carriage together with a stationary grating having a plurality of unevenly spaced apertures, provides velocity data of the rate of the relative movement of the sensor and grating during acceleration. In particular, the sensor detects light through each of the apertures as the sensor moves relative to the grating. The light signal time is conveyed to a counter and the time is compared to a reference number representing an acceleration profile or standard number of signals desired for each aperture. If the number of light signals is more than the standard, occurring if the carriage is underspeed, a transistor driver is pulsed to activate an electromagnetic clutch connected to the scanning carriage. When the scanning carriage velocity has increased sufficiently, the clutch is inactivated.

5 Claims, 7 Drawing Figures

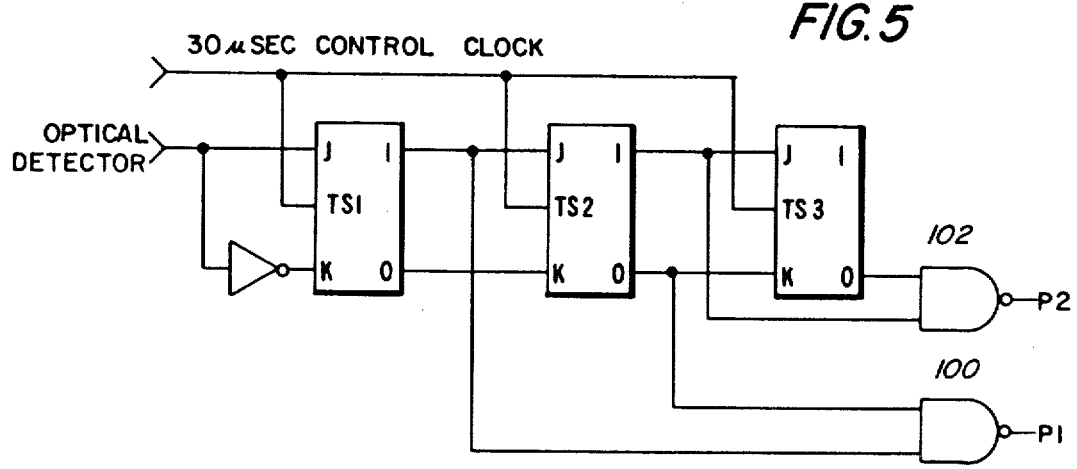
FIG. 5
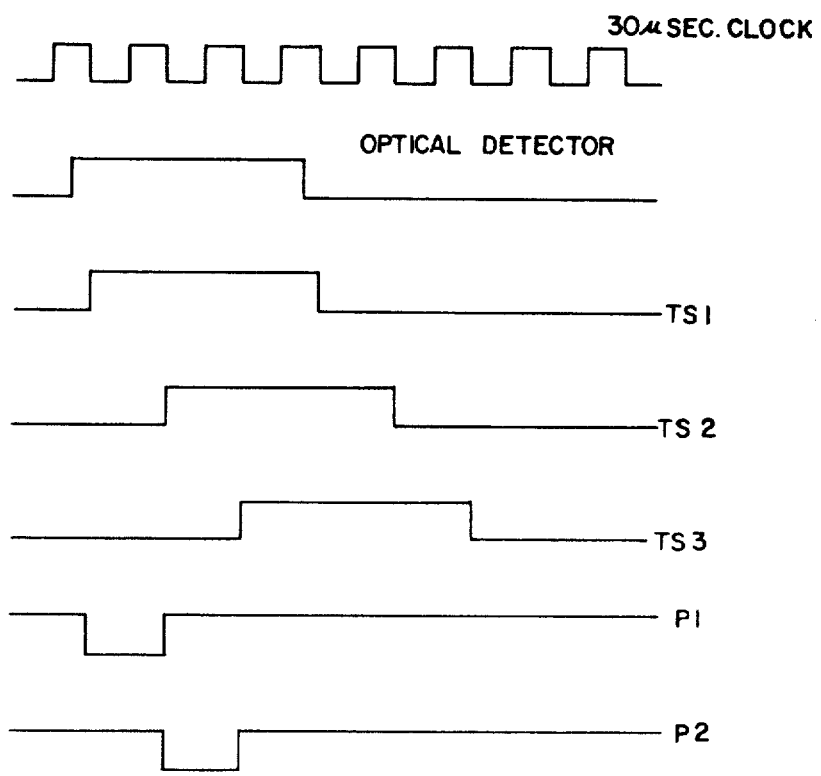

PROGRAMMED ACCELERATION

This invention relates generally to an electrostatographic printing machine using scanning optics, and in particular, to a programmed clutch for controlling the speed of the scanning optics.

Typically, in an electrostatographic printing machine using scanning optics, a scanning carriage traverses a platen in a first direction from a home position to an end of scan position to project images of a document onto a photoreceptor surface. The scanning carriage is then returned in the reverse direction to the home position to begin the next scanning cycle. The return scan time or flyback time is lost since no useful images are being projected during this period. It is therefore desirable to return the scanning carriage to the home position in as short a time as possible without undue strain on the scanning components.

One method in the prior art of accomplishing scan return has been to derive the scan return power from a spring. The spring is loaded during the forward scan operation.

Another method commonly used to control the return of a scanning carriage is a power return. That is, a motor, often the same motor driving the carriage on the forward scan, is used in the return scan. However a simple power return motor would have a rescan velocity the same as the forward scan velocity. Thus, the time to rescan would be as long as the time for forward scan and would significantly reduce the rate the machine produces copies. On the other hand, a high return speed motor usually requires additional controls, thus adding to the cost of the motor and the cost of the power supply and control. It would therefore be desirable to maintain a high rate of copy output for the machine in providing an economical means for carriage return.

It is therefore an object of the present invention to provide a new and improved speed control system that minimizes carriage return time, that minimizes cost, and that operates reliably regardless of the point of carriage end of scan or return velocity profile. It is a further object of the present invention to provide a programmed clutch to control the acceleration rescan velocity according to an acceleration profile.

Further advantages of the present invention will become apparent as the following description proceeds and the features characterizing the invention will be pointed out with particularity in the claims annexed to and forming part of this specification.

Briefly, the present invention is a programmed clutch for controlling the acceleration of a scanning carriage. An encoder including an electro-optic sensor mounted on a moving carriage together with a stationary grating having a plurality of unevenly spaced apertures, provides velocity data of the rate of the relative movement of the sensor and grating during flyback or scan return. In particular, the sensor detects a plurality of light pulses through the apertures as the sensor moves relative to the grating. The light signals are conveyed to a counter and the count is compared to a reference number representing an acceleration profile or standard number of signals desired for each aperture. If the number of light signals is less than the standard, occurring if the carriage is overspeed, a transistor driver is pulsed to activate an electromagnetic clutch connected to the scanning carriage. When the scanning carriage velocity has increased sufficiently, the clutch is deactivated.

For a better understanding of the present invention, reference may be had to the accompanying drawings wherein the same reference numerals have been applied to like parts and wherein FIG. 1 is an elevational view of a reproduction machine incorporating the present invention;

FIGS. 5 and 6 are electrical schematics of the circuitry for controlling the electromechanical clutch in accordance with the present invention.

Figure 1:
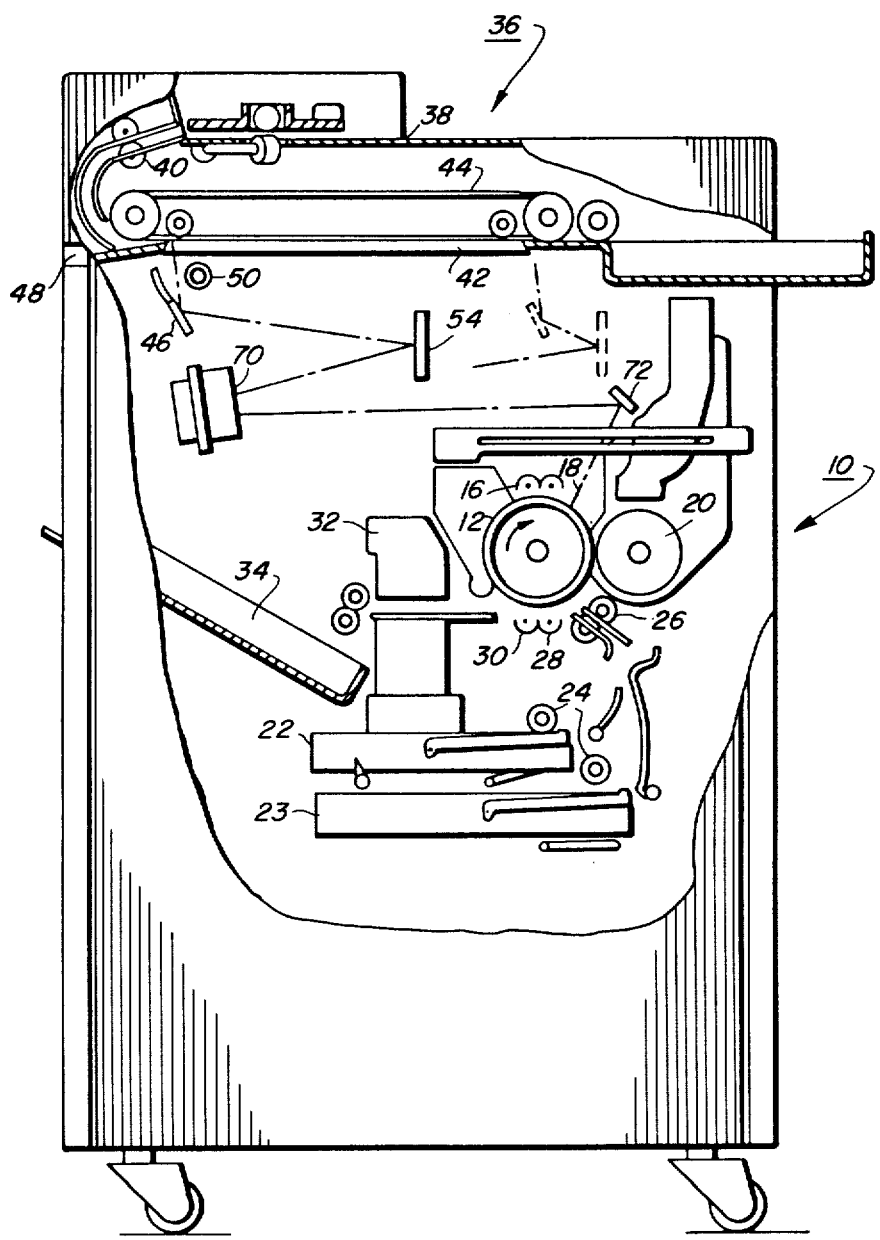

Referring now to FIG. 1, there is shown by way of example a an electrostatographic printing maching 10 incorporating the programmed clutch system of the present invention. It should become evident from the following description that the programmed clutch system is suitable for use in a wide variety of image processing systems and other systems having a velocity control requirement or that would suffer excessively from high acceleration at start up.

The machine 10, employs an image recording drum having its surface 12 coated with a suitable photoconductive material. The drum rotates about shaft in the direction indicated by the arrow to bring the image-bearing surface 12 past a plurality of xerographic processing stations.

The drum moves the photoconductive surface 12 through a charging station 16 for placing an electrostatic charge uniformly over the photoconductive surface 12. Thereafter, the drum is rotated to exposure station 18 for exposure of the charged photoconductive surface 12 to a light image of an original document. After exposure, the drum rotates the electrostatic latent image recorded on the photoconductive surface 12 to development station 20 wherein a conventional developer mix is applied to the photoconductive surface 12 of the drum rendering the latent image visible.

Sheets of final support material are supported in a stack arrangement on a support tray 22 or 23. A sheet separator 24 feeds individual sheets from tray 22 or 23 to the registration system 26. The sheet is then conveyed to the transfer station 28 in proper registration with the image on the drum. The developed image on the photoconductive surface 12 is brought into contact with the sheet of final support material within the transfer station 28 and the toner image is transferred from the photoconductive surface 12 to the contacting side of the final support material. Following transfer of the image, the final support material is transported through a detack station where detack corotron 30 uniformly charges the support material to separate it from the drum.

The copy sheet is then advanced to a fuser 32 to coalesce the transferred powder image to the copy sheet. After the fusing process, the sheet is advanced to a suitable output device such as tray 34.

A document handler 36 can be provided, including an input location 38 for inserting documents. When a document is inserted, a document alignment roll 40 feeds the document forward. The document is fed around 180° curved guides onto the platen 42 by a platen belt transport 44.

Figure 2:
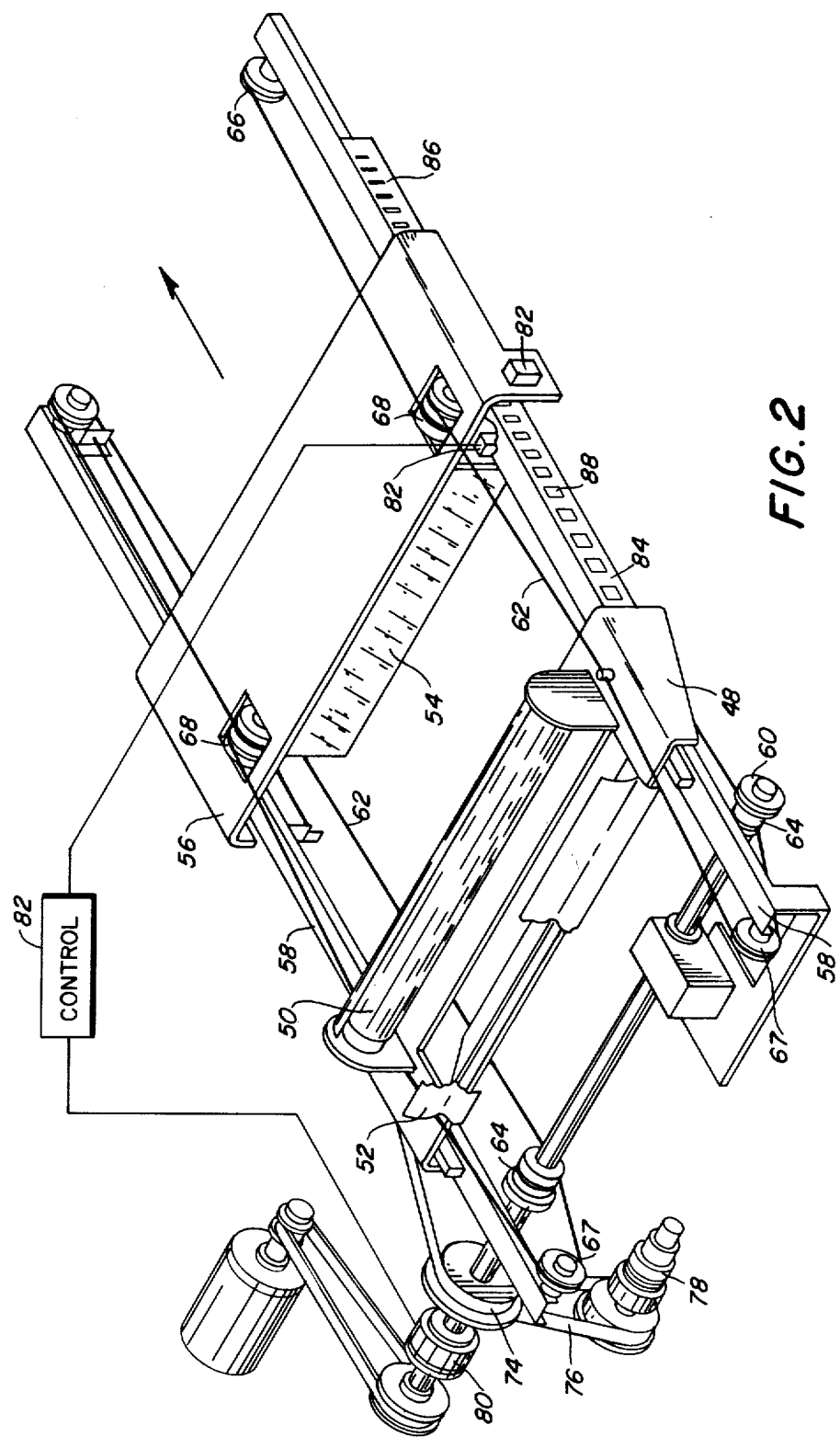
FIG. 2 is an isometric view of the scanning carriage incorporating the present ivnention.
Figure 3:
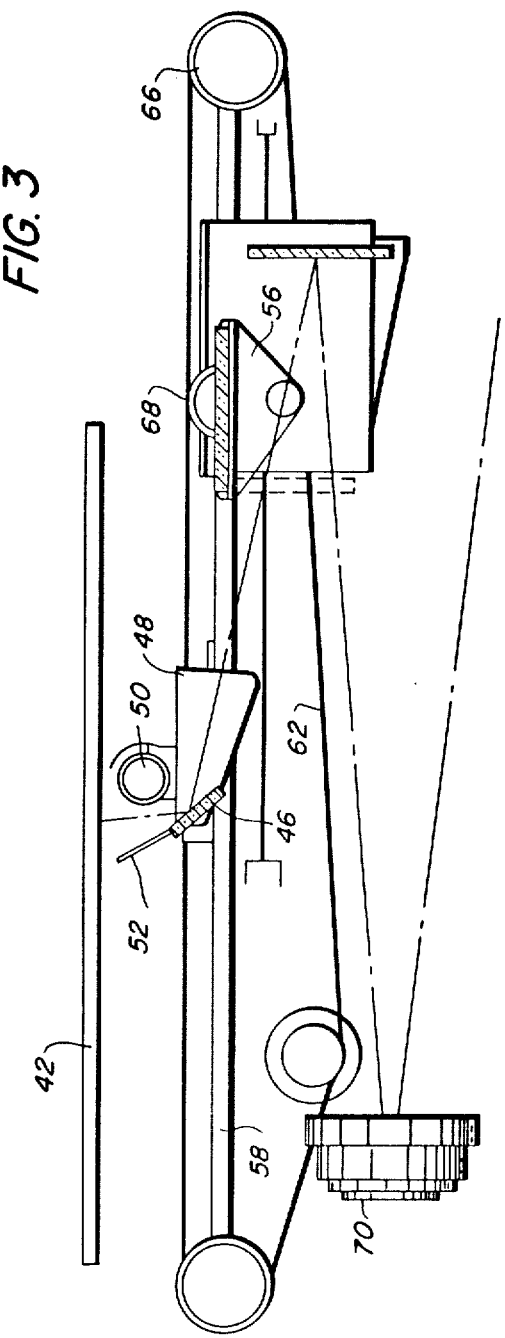
FIG. 3 is an elevational view of the scanning carriage of FIG. 2.

With reference to FIGS. 1, 2 and 3, the image of the document is projected from platen 42 by means of a full rate mirror 46 scanning the entire original document. The mirror 46 is carried by a full rate scanning carriage 48, the carriage 48 also supporting the illuminating lamp 50 and the object reflector 52. As the full rate mirror 46 scans the original document on the platen 42, the half rate mirror 54 mounted on half rate carriage 56 moves at one half the rate of the full rate mirror 46 to maintain the object to lens conjugate equal to the lens to image conjugate. Typically, the length of the scan of the full rate mirror 46 is the length of a normal letter size document. With larger documents clearly the length of scan of the full rate mirror must be at least as large as the document and the half rate scaning mirror must also be moved an additional distance at one half the rate of the full rate mirror.

Both the full rate mirror carriage 48 and the half rate mirror carriage 56 ride on parallel optical guide rails 58 and are driven by the optics drive shaft 60. The optics drive shaft 60 is driven from a main drive belt from the machine main driver motor (not shown). The carriages 48 and 56 are driven by means of cables 62 that are coiled around capstans 64 and wrapped around optics idler wheels 66. With the arrangement shown in FIG. 2, the cables are also wrapped around idler wheels 68 for transporting the half rate carriage 56.

Light rays from the object or document on platen 42 are reflected from half rate mirror 54 to the half lens system 70 which collects light from the input side of the lens and forms an image that is reflected from the drum mirror 72 onto the photoreceptor surface 12.

In operation, with reference to FIGS. 2 and 3, as soon as the main drive motor turns on, mechanical drive is applied to the scan drive clutch 74 via scan drive belt 76. The scan drive clutch energizes and rotates the scan drive shaft 60 in the scan direction, that is, in the direction of the arrow in FIG. 2. The rotation of the scan drive shaft 60 turns the scan drive pulleys 66, and in turn drive is transmitted to the optical carriage assemblies 48 and 56 via the scan drive cable 62.

When the full rate carriage 48 reaches the end of scan position and a (not shown) scan switch is actuated, the scan drive clutch 74 will deenergize. A programmed clutch 80 is energized causing the scan drive shaft 60 to rotate in the reverse direction. This reverse rotation winds up the scan cables on the scan drive pulleys 67, now in the opposite direction, causing the carriages 48, 56 to move from the end of scan to the scan home position. It should be noted that, preferably, the length of scan will be determined by the length of the document to be copied. Thus, the return scan will often begin from different end of scan positions. At these times the logic not the scan switch will cause the drive clutch to deenergize.

The scan drive shaft 60 is also driven by the clutch assembly 80. It is important to return the carriages back to the home position as fast as possible for efficient operation and yet control the acceleration and deceleration of the carriages 48, 56 in order not to damage the optical components or to cause excessive noise. Accordingly, the electromagnetic clutch 80 provides a controlled acceleration of the carriages to prevent damage. That is, the electromagnetic clutch provides latitude by controlling the acceleration profile.

In accordance with the present invention, a suitable electromechanical sensor 82, preferably mounted on the half rate carriage 56, moves in communication with a rigidly fastened grating. The grating 84 comprises a frame 86 including a plurality of variable width unevenly spaced apertures 88. In the preferred embodiment, the apertures are etched in beryllium.

It should be noted, however, that the grating 84 could be mounted for sliding forward and backward. For example, a not shown pin mounted on the carriage 56 could communicate with a slot provided in a portion of the grating 84. Whenever the carriage 56 moving in the direction of the arrow, shown in FIG. 2, came to the end of the grating 84, the pin would engage the end of the slot. The carriage would, therefore, pull the grating to the end of carriage position. The advantage of this arrangement is that regardless of the length of the forward scan, the carriage would immediately be accelerated at the same rate at the beginning of the return scan. During the return scan, the pin would engage the other end of the slot, to pull the grating 84 back to the start of scan position.

Figure 4:
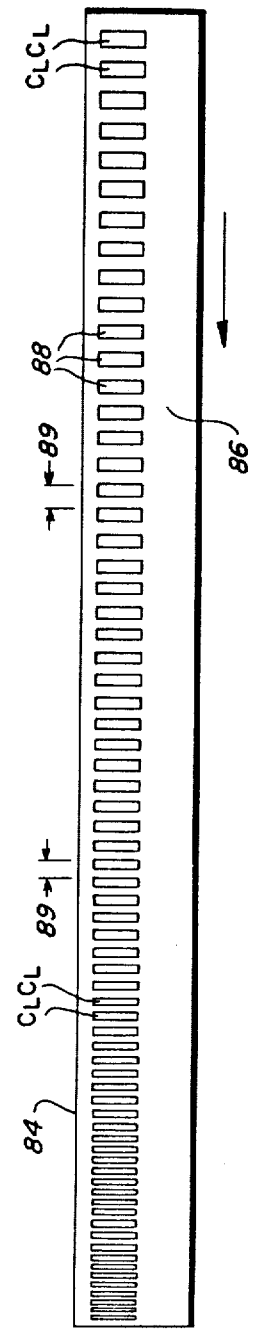
FIG. 4 is an illustration of the grating as shown in FIG. 3.

With respect to FIG. 2, the electro-optic sensor 82 moves with respect to the grating 84 opposite the direction of the arrow, or right to left during return scan. The grating 84, illustrated in detail in FIG. 4, presents to the sensor 82 apertures 88 of progressively larger width. That is, assuming the sensor 82 moves in the direction of the arrow in FIG. 4, the center line to center line spacing CL—CL of the apertures 88 becomes smaller, and also the width W and pitch 89 of the apertures 88 becomes smaller. As the sensor 82 moves relative to the grating 84, the light pulse emitted from the electro-optic sensor 82 will either pass through an aperture 88 or be blocked by the frame 86 of the grating 84. The electromagnetic sensor 82 and clutch 80 are electrically connected to the control 82 as illustrated in FIG. 2. For a more detailed description of the control 82, reference is made to copending application Ser. No. 80,624 filed Oct. 1, 1979 incorporated herein.

In accordance with the present invention, light pulses sensed by the electro-optic sensor 82 passing through each of the apertures 88 provide corresponding electrical pulse signals conveyed to the control 82. In response to the electrical pulse signals, the control 82 selectively activates the electromagnetic clutch 80 to accelerate the scanning carriages 48 and 56 according to a predetermined acceleration profile. In a preferred embodiment, the full rate scanning carriage is accelerated from a speed of approximately zero inches per second (ips) to 90 ips. It should be noted that the control could be implemented with other devices such as an optical disc mounted on a capstan shaft.

The control operation is best explained by a specific example. Assume a fixed clock rate of 30 microseconds. That is, there is an electro-optic sense operation once every 30 microseconds. Since there is relative movement between the sensor 82 and the grating apertures 88, there will be a given number of sense operations within an aperture 88 depending upon the relative speed. One means to provide the profile is to require that the sense period or time period for sense operations within a given aperture is constant for any size aperture. This constant time period is assumed to be 3 milliseconds. In other words, it is desired to maintain a 3 millisecond time period for the sensor 82 to obtain measurements across any given aperture pitch 89. Therefore, to obtain this constant time period, the relative speed of the sensor and the aperture must be greater for the larger width apertures than for the smaller width apertures.

With these assumptions, the next step is to determine aperture widths to provide a desired acceleration profile. By selectively increasing the aperture widths in the direction of movement of the sensor, a given rate of acceleration can be achieved. In fact, the acceleration is controlled by maintaining the speed of acceleration to maintain a constant 3 millisecond time period within each of the apertures.

Therefore, assume the final speed to be detected for the large width apertures is 90 inches per second and that acceleration is in 2.5 inches per second increments. Because we are accelerating presumably in a linear path, $$D = \frac{V_1 + V_2}{2} \times t$$

where D equals the aperture pitch W (distance from leading edge of one aperture to leading edge of adjacent aperture). $V_1$ and $V_2$ equal the velocity of the scanning carriage at beginning and end of the aperture, and T equals the desired constant time period across one aperture pitch.

$$D = \frac{88.5 + 90}{2} \times .003 = .268 \text{ inch}$$

Thus, the desired aperture width is 0.268 inch for a speed of 90 ips. For a desired velocity of the scanning carriage of 45 inches per second, the required aperture space is approximately 0.132 inch to maintain a 3 millisecond time period across the aperture. Thus, the aperture widths together with the electro-optic sensor program or control a desired scanning carriage acceleration.

In a preferred embodiment, the grating has 60 aperture pitches. Therefore, the length of the grating to accelerate from 0 ips to 90 ips is $$L = \frac{V_0 + V_{90}}{2} \times (W \times .003) =$$

$$\frac{0 + 90}{2} \times (60 \times .003) = 8.1 \text{ inch.}$$

The actual acceleration control is accomplished in the following manner. We have assumed that there is a 30 microsecond clock. We have also assumed a 3 millisecond time period. Therefore, if we are maintaining the 3 millisecond time period, there are $$\frac{3 \text{ milliseconds}}{30 \text{ microseconds}} = 100 \text{ clock pulses per time period}$$

if the scanning carriage is following the program speed.

Assume, however, that as the scanning carriage passes the first 0.268 inch width aperture, it is traveling at a speed less than 90 inches per second. Therefore, since it is traveling at a less speed, there is more than a 3 millisecond time period across the 0.268 inch space. Therefore, more than 100 clock pulses will be detected by the sensor 82. This condition, indicating underspeed, will initiate or generate a signal to clutch 80 to increase the speed of the scanning carriage. If there are less than 100 clock pulses counted, this will indicate an overspeed condition, and no clutch action will be taken.

Likewise, across the 0.133 inch aperture the carriage is programmed to be moving at 45 inches per second. The number of 30$\mu$ sec clock pulses obtained within the aperture space is counted and if less than 100, indicating an overspeed condition, there will be no action. However, if more than 100 pulses are counted, indicating an underspeed condition, a clutch action will be initiated. Preferably, once the clutch is activated, it will remain on a maximum of 10 milliseconds.

Any single pitch of the grating, i.e. the distance between leading edges of successive apertures can be equal distance in time or can be dimensionally equal spaced. In the higher velocity positions, you would tend to make them equal distance in time. However, at low speeds because of sensor considerations for the first slot, equal dimensional spacing may be desirable.

Figure 6:
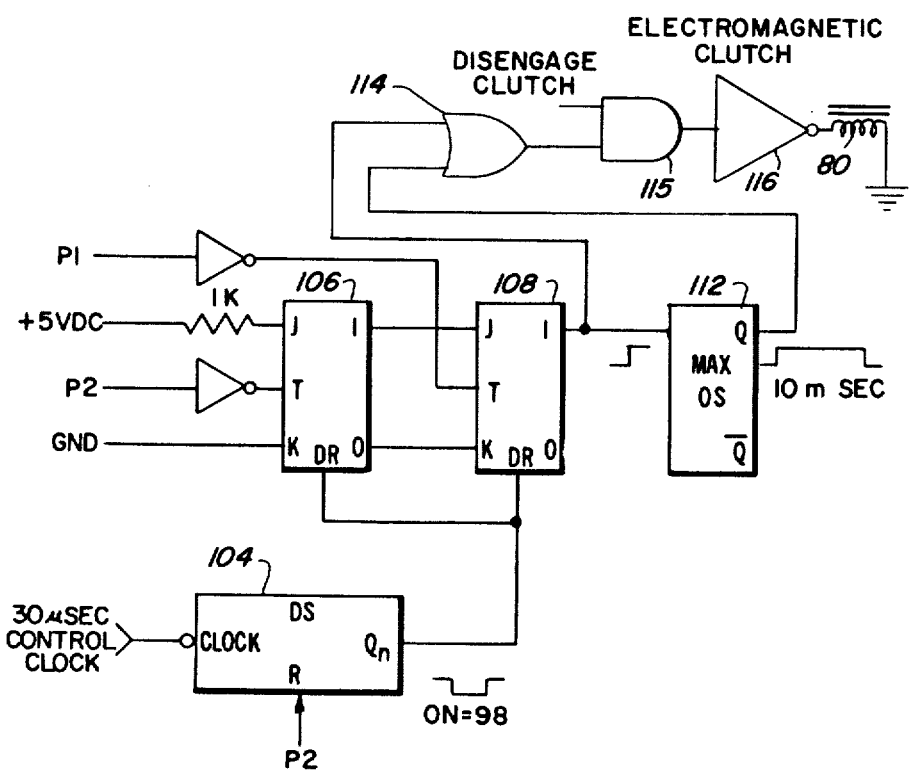

In general, the return speed of the carriage 48 is monitored as the sensor 82 scans past each of the apertures 88 of the grating 84. With reference to FIGS. 5 and 6, the pulses P1 and P2 are produced for each new aperture detected. These pulses initiate the counting of counter 104. The number of pulses sensed by sensor 82 for each of the apertures is counted and depending upon the count, an underspeed or overspeed condition is indicated. If an underspeed condition is indicated, the clutch 80 is turned on or is maintained in the on condition. On the other hand, an underspeed condition will be conveyed to a minimum one shot multivibrator 110 and to "OR" gate 114. This will cause the turn on of the electromagnetic clutch 80 until an overspeed condition is indicated or 10 milliseconds whichever is less.

In particular, in FIG. 5 there is shown a shift register including flip flops TS1, TS2 and TS3. The signal from the sensor 82 is conveyed to flip-flop TS1 and each of the flip-flops is electrically connected to the 30 microsecond control clock. As the clock signal shifts from minus to plus, the shift register flip-flops sequentially shift from minus to plus providing pulses P1 and P2 at the output of the respective NAND gates 100 and 102. FIG. 5 also illustrates the signal waveforms of the optical detector, the control clock, P1, P2 and the outputs of the flip-flops TS1, TS2 and TS3.

With reference to FIG. 6, the counter 104 receives a 30 microsecond control clock pulse, a P2 signal, and provides an output signal at QN to each of two flip-flops 106, 108. In operation, the counter number 104, records the number of clock signals occurring in the time period for the sensor 82 to scan past a single aperture pitch 89. A count of clock pulses including the single P2 signal greater than 98 manifests an underspeed condition. The output signal at QN is a 30 microsecond pulse (equal to the length of one control clock) and provides a negative pulse to a dominant reset (DR) of flip-flops 106 and 108. In this condition the clutch 80 is activated or remains inactivated.

An underspeed condition is expressed by flip-flop 106 being low at time P1 and an overspeed is expressed by flip-flop 106 being high at time P1. Flip-flop 108 is set when flip-flop 106 indicates an overspeed at time P1. The flip-flop 106 information is transferred to flip-flop 108 at the time of pulse P1. Pulse P2 then simultaneously resets flip-flop 106 and resets counter 104.

It should be noted that pulse P2 will not override a dominant reset from the output of counter 104. It can be seen that the contents of flip-flop 106 are examined and transferred to flip-flop 108 for each new aperture 88 of the grating or grating increment except when inhibited by a dominant reset. In operation, with reference to flip-flops 106 and 108, a count of 98 or greater from counter 104 indicates underspeed.

The output of flip-flop 108 controls the 10 millisecond one slot multivibrator 110. The output of the minimum one shot multivibrator 110 is one input to the two input driver "OR" gate 114. A suitable signal to AND gate 115 during forward scan and deceleration will prevent activation of clutch 80. The purpose of the minimum one shot multivibrator 110 is to minimize the time of the driver 116. A second output of flip-flop 108 goes directly to the driver NAND gate 114. This signal turns on the driver "OR" gate 114 and thus the electromagnetic clutch 80 immediately upon detecting that the system is running underspeed. It also maintains the clutch 80 in an on condition if it is already in an on condition.

Figure 7:
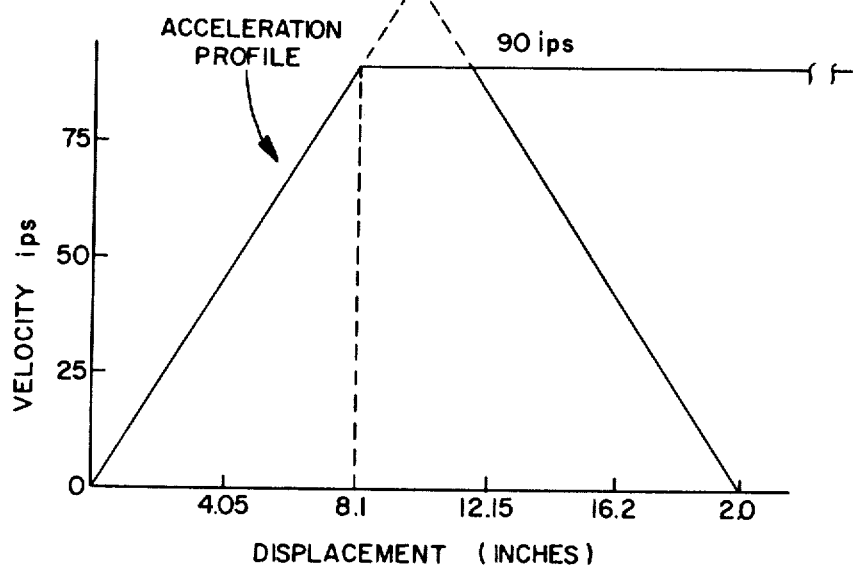
FIG. 7 is an illustration of the carriage velocity intercept of the acceleration profile in accordance with the present invention.

With reference to FIG. 7, the y axis of the graph in FIG. 7 shows the rescan velocity in inches per second from 0 to 100 inches per second. The x axis of the graph illustrates the displacement of the scan carriage 48 in inches from 0 to 20 inches. Zero represents the position of the scan carriage at the end of the document scan position. The carriage 48 in the rescan operation traverses from the end of scan position to the home or beginning of scan position represented by a displacement of 20 inches. That is, the home position of the carriage 48 as illustrated in FIG. 2 is a 20 inch displacement from the furthest end of scan position.

The acceleration rate or programmed clutch profile is shown by the acceleration profile on the graph. It is illustrated as a straight line ascending from a velocity of 0 inches per second at a displacement of 0 inches to a velocity of 90 ips at a displacement of 8.1 inches. It should be noted that the profile extending from 0 to 8.1 displacement inches represents the length of the grating 94 as shown in FIGS. 2 and 4. When the carriage 48 is beyond 8.1 inches, it will not see the grating 84. Thus, the clutch logic will assume underspeed and hold the clutch on until the logic order turn off of the clutch for the deceleration phase.

While there has been shown a feed back system, it should be understood an open loop control system could be used. Thus, the program cycle could be generated using a profile stored in ROM memory and then stepping through the ROM profile for the clutch conditions (on or off) using discrete increments of time. Of course, the success of an open loop control depends upon the degree that the system inertia and friction are constant.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

What is claimed is:

1. In a reproduction machine having a photoreceptor, a carriage, a clutch mechanically connected to the carriage and a platen, the carriage scanning the platen for projecting images of objects on the platen onto the photoreceptor, and means for controlling the acceleration of the scanning carriage including
   a control
   a displacement sensor mounted on the carriage and
   a grating including a frame having a plurality of spaced apertures, the grating rigidly secured to the reproduction machine, the sensor disposed in relation to the grating to provide signals manifesting the speed of the carriage, the control responsive to the signals to selectively activate the clutch to change the speed of the carriage.

2. The reproduction machine of claim 1 wherein the displacement sensor detects light signals as a function of the spaced apertures and the relative speed of the grating and the carriage, the apertures having variable width.

3. The reproduction machine of claim 1 including a fixed rate signal and counter circuitry, the counter circuitry responsive to the fixed rate signal to determine the number of signals within an aperture pitch, the number of signals within a given aperture pitch manifesting either an underspeed or an overspeed of the carriage.

4. In a reproduction machine including a scanning carriage, a grating having a plurality of apertures and an electro-optic sensor, the sensor detecting pulses through said apertures, the grating and sensor mounted for relative motion, the sensor detecting light pulses through the apertures, a speed control comprising a clutch connected to the carriage and
   a counter responsive to the sensor to determine the number of pulses for an aperture pitch whereby a predetermined count initiates activation of the clutch to accelerate the movement of the carriage.

5. The speed control of claim 4 wherein the sensor is mounted on the scanning carriage and the grating is rigidly secured to the machine frame.

* * * * *